United States Patent [19]
Patti

[11] Patent Number: 5,163,797
[45] Date of Patent: Nov. 17, 1992

[54] VEHICLE LUG NUT COVERS
[75] Inventor: Anthony J. Patti, Hayward, Calif.
[73] Assignee: Wheel Masters Inc., San Leandro, Calif.
[21] Appl. No.: 783,327
[22] Filed: Oct. 28, 1991
[51] Int. Cl.[5] ............................ F16B 37/14; B60B 7/00
[52] U.S. Cl. ...................................... 411/431; 411/372; 411/918
[58] Field of Search ............... 411/372, 375, 377, 430, 411/431, 525, 526, 527, 528, 437, 910, 918; 301/37 S, 108 S

[56] References Cited
U.S. PATENT DOCUMENTS

| | | | |
|---|---|---|---|
| 2,654,113 | 10/1953 | Becker | 411/372 |
| 2,846,744 | 8/1958 | Becker | 411/918 |
| 3,007,726 | 11/1961 | Parkin | 411/918 |
| 3,485,134 | 12/1969 | Ott | 411/372 |
| 4,582,462 | 4/1986 | Thiel | 411/377 |
| 4,948,319 | 8/1990 | Day et al. | 411/372 |
| 4,968,202 | 11/1990 | Lanham | 411/910 |
| 5,031,965 | 7/1991 | Buerger | 301/37 S |

FOREIGN PATENT DOCUMENTS
2386722  11/1978  France ................ 411/431

Primary Examiner—Neill R. Wilson
Attorney, Agent, or Firm—Linval B. Castle

[57] ABSTRACT

Ornamental lug nut covers, protecting the a vehicle lug nut and threads are formed with a outwardly extending flanges with edges folded over to capture the rims of retainer rings having inward facing tabs that butt and lock against the surfaces of lug nuts. The flange may be used to secure vehicle wheel covers having oversize mounting holes that can fit around the outside of the nut so that only the flange and not the lug nut secures the wheel cover.

7 Claims, 2 Drawing Sheets

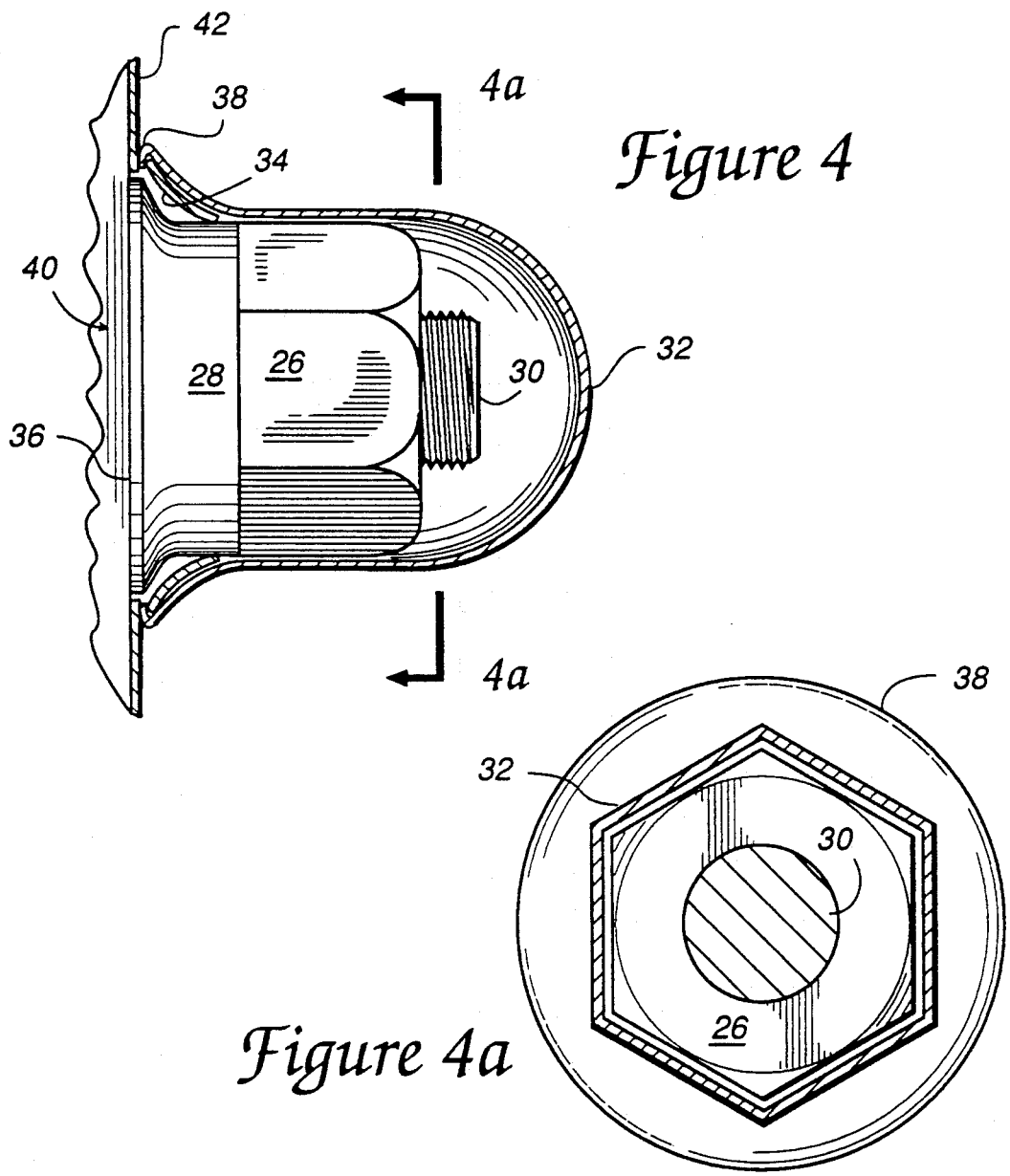
Figure 4
Figure 4a
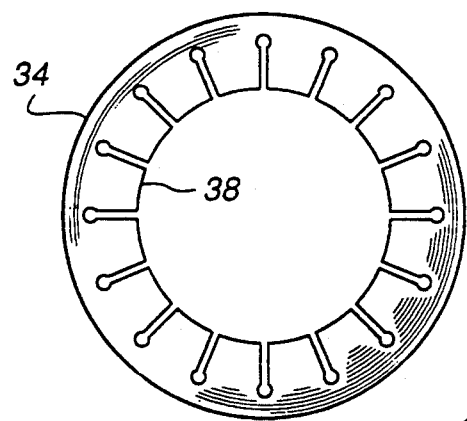
Figure 5

VEHICLE LUG NUT COVERS

BACKGROUND OF THE INVENTION

This invention relates to lug nut covers and particularly to covers particularly valuable for securing an ornamental wheel cover to the vehicle wheel.

Lug nut covers are generally chrome plated, enclosed, tubular metal caps that provide an ornamental cover the wheel lug and its lug nut. While most popular as an ornamental cover, they also protect the threads of the stud or lug bolt from damage, dirt and rust. One difficulty, however, is that they are difficult to secure to the vehicle lug nut and are often lost. One solution is, of course, to combine the lug nut and ornamental cover by replacing the conventional lug nut with a special ornamental lug nut with a closed end or, as described in U.S. Pat. No. 4,775,272, by welding a decorative hex shaped cap to a lug nut. Closed end ornamental lug nuts and even key-locked lug nuts are presently available but such special lug nuts are costly, heavy, and their use may invalidate a warranty or raise questions of insurability by possibly failing to meet the torsion or strength specifications prescribed for the wheel nuts supplied by the manufacturer.

Vehicle wheel covers are ornamental discs for covering the hub and wheel mounting hardware and, on automobiles, are usually mounted by resiliently locking into a wheel rim. On heavier vehicles such as trucks and recreation vehicles having dual rear wheels, the wheel shape makes rim mounting very difficult and the larger wheel covers are often attached by use of special clips that engage the "hand holds" in the wheel, or by securing the wheel cover under the lug nuts, a dangerous practice that could jeopardize an operation or warranty as previously explained.

The vehicle lug nut cover to be described not only provides an ornamental cover and protection for the lug nut and exposed stud or lug bolt but also provides a locking mechanism for securing an ornamental wheel cover.

Briefly described, the vehicle lug nut cover includes a metal cover with a first closed end and an outwardly flared second end which captures a circular clip having a plurality of inward facing tabs which, when forced over a lug nut, lock against the surface of the nut. The wheel cover has mounting holes aligned with the pattern of the wheel studs, each with a diameter larger than the lug nut, but smaller than the diameter of the flared second end of the lug nut cover. Thus, when the covered lug nuts are applied, the flared portions of the nut cover will secure the wheel cover tightly against the wheel.

BRIEF DESCRIPTION OF THE DRAWINGS

In the drawings which illustrate the preferred embodiments of the invention:

FIG. 4 is a sectional view of a portion of a wheel, a wheel cover and a flared lug nut cover; and FIG. 4a is a sectional view taken along the lines 4a—4a of FIG. 4;

FIG. 5 is a plan view of the retainer clip used with the embodiment of FIG. 4.

DETAILED DESCRIPTION OF THE PREFERRED EMBODIMENT

Figure 1:
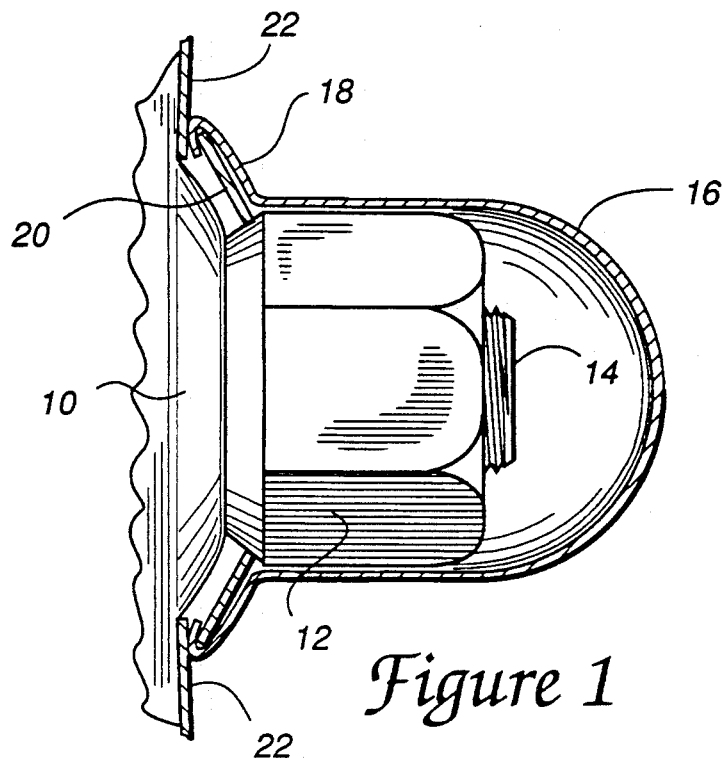
FIG. 1 is a sectional view of a portion of a wheel, a wheel cover, and a lug nut and lug nut cover.

FIG. 1 illustrates a vehicle wheel 10 with a lug nut 12 on a lug bolt 14 that extends out from a vehicle hub. Covering the nut 12 is a lug nut cover 16 that may be dome shaped on the outer end and has a hexagonal or polygonal central cross section to closely fit around the body of the lug nut. A flange 18 is formed at the open end of the nut cover and the outer edge of the flange is preferably turned under to capture the peripheral edge of a retainer ring 20.

FIG. 1 illustrates the central portion of a wheel cover 22 currently popular for use on recreation vehicles and some heavy trucks. Wheel covers are usually spun or pressed ornamental discs that cover the wheel and the central portion surrounding the vehicle hub is usually flat as shown. The wheel cover 22 is formed to include the ring of holes to accommodate the vehicle wheel studs or lug bolts, the holes being of a diameter larger than that of a lug nut yet small enough to fit under the flange 18, as shown. Thus, the diameter of the flange 18 and ring 20 must be greater than the diameter of the wheel cover mounting holes so that the flange and ring will securely clamp around the mounting hole edges.

Figure 2:
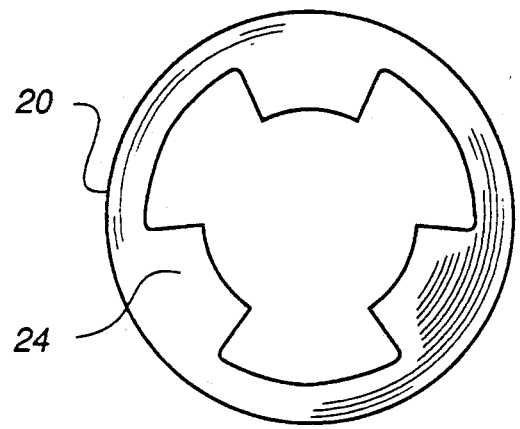
FIG. 2 is a plan view of a retainer clip for securing the lug nut cover to the lug nut.
Figure 3:
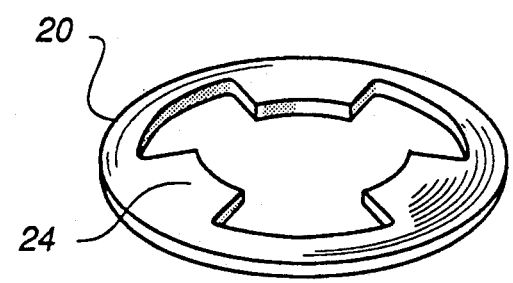
FIG. 3 is a perspective view of the retainer clip in FIG. 2.

The retainer ring 20 is preferably thin resilient steel and, as shown in FIG. 2 and the perspective view of FIG. 3, is circular in shape with a central opening formed with three or more equally spaced tabs 24 that extend toward the center to form a circular opening substantially larger than the diameter of a lug bolt 14 but smaller than the outside diameter of the lug nut 12.

Some trucks and recreation vehicles to not employ lug nuts with conical end surfaces as shown in FIG. 1, but instead use special lug nuts which include attached, freely-rotating, flange sections having a flat surface that bears directly against the wheel surface.

FIG. 4 illustrates such a lug nut 26 with attached flange 28 that is axially rotatable independently of the nut. Therefore, as the nut is threaded on its lug bolt 30 the flange portion of the nut may remain stationary as it is tightened against the vehicle wheel.

A lug nut cover 32 is locked on the lug nut in the same manner as described in connection with the nut cover of FIG. 1. A commercially available retainer ring 34, such as illustrated in detail in FIG. 5, is forced down over the nut and flange body until the outer ring portion of the ring 34 is substantially flush with the flat end surface 36 of the flange. The inner edges 38 of the fingers of the ring 34 then bite into the exterior surface of the nut 26 or its flange 28 to prevent removal of the ring over the lug bolt and, as in FIG. 1, the flange end portion 38 of the lug nut cover 32 is then bent around the periphery of the ring 34, as shown, to lock the nut cover 32 to the lug nut.

When the flanged lug nut is tightened against a vehicle wheel 40 that may be covered with an ornamental wheel cover 42, the flange portion of the nut cover 32, reinforced by the retainer ring 34, will tightly secure the wheel cover against the vehicle wheel.

I claim:

1. An ornamental and protective cover for a vehicle wheel lug nut, said nut cover comprising:
    a tubular member having side walls shaped to (conform to) closely fit around the sides of the wheel lug nut on a wheel lug bolt, said member having a closed first end and an outward extending flange at its second end;

a retainer ring within said tubular member and engaged by said flange, said ring having inwardly extending tabs for terminating against the surface of the lug nut.

2. The lug nut cover claimed in claim 1 wherein the end surfaces of said tabs extend inwardly to a point that forms an open central circle having a diameter greater than the diameter of the lug bolt and less than the diameter of the lug nut.

3. The lug nut cover claimed in claim 2 wherein the end surfaces of said tabs are arcuate.

4. The lug nut cover claimed in claim 3 wherein said closed first end of said tubular member is dome shaped.

5. The lug nut cover claimed in claim 1 wherein the peripheral portion of the outward extending flange of said tubular member is bent under to capture the periphery of said retainer ring.

6. The lug nut cover claimed in claim 5 wherein the wheel lug nut has a conical inner end surface for centering a wheel on a lug bolt in a vehicle hub and wherein said inwardly extending tabs terminate against said conical inner end surface.

7. The lug nut cover claimed in claim 5 wherein said wheel lug nut has a flanged (freely rotating) end section rotatable independently of said nut and wherein said inwardly extending tabs bit into the surface of said lug nut and said flanged end section.

* * * * *